US012744410B2

(12) United States Patent
Mehas et al.

(10) Patent No.: US 12,744,410 B2
(45) Date of Patent: Sep. 22, 2026

(54) WIRELESS POWER TRANSMITTER IMPLEMENTING LOW POWER PRE-CHARGING FOR FOREIGN OBJECT DETECTION IN A SEMICONDUCTOR DEVICE

(71) Applicant: Renesas Electronics America Inc., Milpitas, CA (US)

(72) Inventors: Gustavo James Mehas, Fall City, WA (US); Giovanni Figliozzi, Zurich (CH)

(73) Assignee: Renesas Electronics America Inc., Milpitas, CA (US)

( * ) Notice: Subject to any disclaimer, the term of this patent is extended or adjusted under 35 U.S.C. 154(b) by 21 days.

(21) Appl. No.: 18/962,667

(22) Filed: Nov. 27, 2024

(65) Prior Publication Data

US 2026/0149309 A1 May 28, 2026

(51) Int. Cl.
*H02J 50/12* (2016.01)
*H02J 50/60* (2016.01)

(52) U.S. Cl.
CPC .............. *H02J 50/12* (2016.02); *H02J 50/60* (2016.02)

(58) Field of Classification Search
CPC ................................. H02J 50/12; H02J 50/60
USPC ......................................................... 307/104
See application file for complete search history.

(56) References Cited

U.S. PATENT DOCUMENTS

2023/0269117 A1* 8/2023 Mehas .................... H03K 5/01 375/238
2025/0385550 A1* 12/2025 Sautto .................... H02J 50/12

* cited by examiner

*Primary Examiner* — Richard Tan
(74) *Attorney, Agent, or Firm* — SCULLY, SCOTT, MURPHY & PRESSER, P.C.

(57) ABSTRACT

In an embodiment, a semiconductor device is disclosed that includes a buffer circuit that is configured to selectively output a charge signal to an inductor-capacitor node of a power driver to charge the inductor-capacitor node to a predetermined voltage level and an amplifier circuit that is configured to monitor a voltage differential across a capacitor of the inductor-capacitor node of the power driver. The amplifier circuit is configured to output a positive side signal and a negative side signal. The semiconductor device further includes an output that is configured to provide at least one signal based on the positive side signal and negative side signal to an analog-to-digital converter for measurement by a controller.

19 Claims, 8 Drawing Sheets

SW1

LC node

R/2L decay

FIG. 2

WIRELESS POWER TRANSMITTER IMPLEMENTING LOW POWER PRE-CHARGING FOR FOREIGN OBJECT DETECTION IN A SEMICONDUCTOR DEVICE

BACKGROUND OF THE SPECIFICATION

The present disclosure relates in general to apparatuses and methods for communication between wireless power transmitters and wireless power receivers.

Wireless power systems often include a power transmitter and a power receiver. When a transmission coil of the power transmitter and a receiver coil of the power receiver are positioned close to one another they form a transformer that facilitates inductive transmission of an alternating current (AC) power between the power transmitter and the power receiver. The power receiver often includes a rectifier circuit that converts the AC power into a direct current (DC) power that may be utilized for various loads or components that require DC power to operate. The power transmitter and the power receiver also utilize the transformer to exchange information or messages using various modulation schemes. For example, the power receiver may include a resonant circuit having one or more capacitors and may switch in or switch out a different number of capacitors of the resonant circuit to generate amplitude shift key (ASK) signals and encode messages in the ASK signals. The power receiver can transmit the ASK signals to the power transmitter to communicate with the power transmitter via the transformer. The power transmitter decodes the messages from the ASK signals received from the receiver and encodes response messages in frequency shift key (FSK) signals that may be transmitted back to the power receiver via the transformer.

Foreign object detection (FOD) circuitry is utilized to detect when foreign objects such as e.g., coins, paper clips, keys, aluminum foil, metallic objects, magnetic objects or any other objects, that may affect or be affected by the magnetic field generated by the power transmitter are positioned within the region where the magnetic field will be generated either before, during or after power transfer.

An interrogation signal is utilized to determine if a power receiver is present and also to perform FOD detection. As an example, the Wireless Power Consortium (WPC) (Qi) standard specification provides for an interrogation signal, referred to as Q-Ping, that may be used for this purpose. The interrogation signal allows the power transmitter to examine the reactive impedance characteristics of the environment in which the power transmitter plans to transmit power.

Implementing the interrogation signal may be challenging because the implementation requires a precise measurement of both the frequency and the decay rate of the resulting dampened sinusoidal waveform. In some cases, the measurements may be distorted due to parasitic diode and transistor turn-on during the measurement process which is challenging to address.

SUMMARY

In an embodiment, a semiconductor device is disclosed that comprises a buffer circuit that is configured to selectively output a charge signal to an inductor-capacitor node of a power driver to charge the inductor-capacitor node to a predetermined voltage level, an amplifier circuit that is configured to monitor a voltage differential across a capacitor of the inductor-capacitor node of the power driver, the amplifier circuit being configured to output a positive side signal and a negative side signal and an output that is configured to provide at least one signal based on the positive side signal and negative side signal to an analog-to-digital converter for measurement by a controller.

In another embodiment, a wireless power transmitter is disclosed that comprises a controller, the controller is configured to execute a bias routine, a charge routine and a measurement routine. The bias routine comprises setting a buffer circuit of a semiconductor device of the wireless power transmitter to a bias voltage level turning on an output of the buffer circuit to an inductor-capacitor node of a power driver of the wireless power transmitter to charge the inductor-capacitor node to the bias voltage level determining that the inductor-capacitor node has achieved the bias voltage level and turning off the output of the buffer circuit. The charge routine comprises setting the buffer circuit to a charge voltage level that is smaller than the bias voltage level, turning on the output of the buffer circuit to the inductor-capacitor node to charge the inductor-capacitor node to the charge voltage level, determining that the inductor-capacitor node has achieved the charge voltage level and turning off the output of the buffer circuit. The measurement routine comprises activating an amplifier circuit of the semiconductor device that is configured to monitor a voltage differential across a capacitor of the inductor-capacitor node and output a positive side signal and a negative side signal and measure at least one characteristic of the inductor-capacitor node based at least in part on the positive side signal and the negative side signal.

In another embodiment, a method of operating a wireless power transmitter is disclosed that comprises executing a bias routine, a charge routine and a measurement routine. The bias routine comprises setting a buffer circuit of a semiconductor device of the wireless power transmitter to a bias voltage level turning on an output of the buffer circuit to an inductor-capacitor node of a power driver of the wireless power transmitter to charge the inductor-capacitor node to the bias voltage level determining that the inductor-capacitor node has achieved the bias voltage level and turning off the output of the buffer circuit. The charge routine comprises setting the buffer circuit to a charge voltage level that is smaller than the bias voltage level, turning on the output of the buffer circuit to the inductor-capacitor node to charge the inductor-capacitor node to the charge voltage level, determining that the inductor-capacitor node has achieved the charge voltage level and turning off the output of the buffer circuit. The measurement routine comprises activating an amplifier circuit of the semiconductor device that is configured to monitor a voltage differential across a capacitor of the inductor-capacitor node and output a positive side signal and a negative side signal and measure at least one characteristic of the inductor-capacitor node based at least in part on the positive side signal and the negative side signal.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 2 is a diagram illustrating an ideal decay waveform during wireless power receiver (PRx) and foreign object detection by the power transmitter of the system of FIG. 1 according to an embodiment.

DETAILED DESCRIPTION

Figure 1:
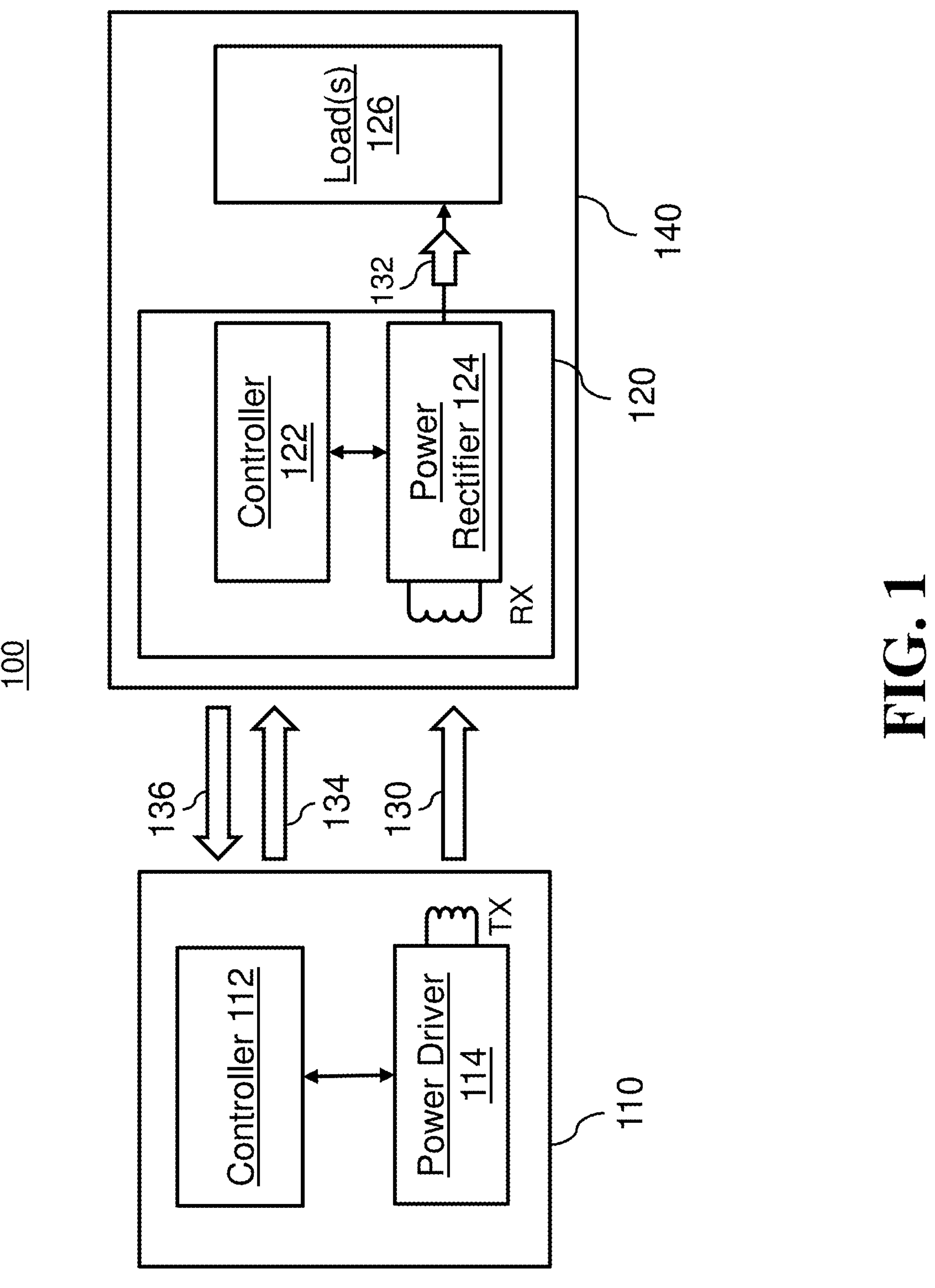
FIG. 1 is a block diagram of an example system for wireless power transfer according to an embodiment.

FIG. 1 is a diagram showing an example system 100 that implements wireless power transfer and communication according to an illustrative embodiment. System 100 comprises a power transmitter 110 and a power receiver 120 that are configured to wirelessly transfer power and data therebetween via inductive coupling. While described herein as power transmitter 110 and power receiver 120, each of power transmitter 110 and power receiver 120 may be configured to both transmit and receive power or data therebetween via inductive coupling.

Power transmitter 110 is configured to receive power from one or more power supplies and to transmit AC power to power receiver 120 wirelessly. For example, power transmitter 110 may be configured for connection to a power supply such as, e.g., an AC power supply or a DC power supply. Power transmitter 110 comprises a controller 112 and a power driver 114.

Controller 112 is configured to control and operate power driver 114. Controller 112 comprises, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 is configured to control power driver 114 to drive a coil TX of the power driver 114 to produce a magnetic field. Power driver 114 is configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards. Controller 112 may be configured as a separate component from power driver 114 or may be included as a part of power driver 114.

Power receiver 120 is configured to receive AC power transmitted from power transmitter 110 and to supply the power to one or more loads 126 or other components of a destination device 140. Destination device 140 may comprise, for example, a computing device, mobile device, mobile telephone, smart device, tablet, wearable device or any other electronic device that is configured to receive power wirelessly. In an illustrative embodiment, destination device 140 comprises power receiver 120. In other embodiments, power receiver 120 may be separate from destination device 140 and connected to destination device 140 via a wire or other component that is configured to provide power to destination device 140.

Power receiver 120 comprises a controller 122 and a power rectifier 124. Controller 122 comprises, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. For example, power rectifier 124 is configured to rectify AC power received from coil RX into DC power which may then be supplied to load 126.

As an example, when power receiver 120 is placed in proximity to power transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126. Load 126 may comprise, for example, a battery charger that is configured to charge a battery of the destination device 140, a DC-DC converter that is configured to supply power to a processor, a display, or other electronic components of the destination device 140, or any other load of the destination device 140.

Power transmitter 110 and power receiver 120 are also configured to exchange information or data, e.g., messages, via the inductive coupling of power driver 114 and power rectifier 124. For example, before power transmitter 110 begins transferring power to power receiver 120, a power contract may be agreed upon and created between power receiver 120 and power transmitter 110. For example, power receiver 120 may send communication packets or other data to power transmitter 110 that indicate power transfer information such as, e.g., an amount of power to be transferred to power receiver 120, commands to increase, decrease, or maintain a power level of AC power 130, commands to stop a power transfer, or other power transfer information. In another example, in response to power receiver 120 being brought in proximity to power transmitter 110, e.g., close enough such that a transformer may be formed by coil TX and coil RX to facilitate power transfer, power receiver 120 may be configured to initiate communication by sending a signal to power transmitter 110 that requests a power transfer. In such a case, power transmitter 110 may respond to the request by power receiver 120 by establishing the power contract or beginning power transfer to power receiver 120, e.g., if the power contract is already in place.

Power transmitter 110 and power receiver 120 may transmit and receive communication packets, data or other information via the inductive coupling of coil TX and coil RX. As an example, communication packet sent from power transmitter 110 to power receiver 120 may comprise frequency shift key (FSK) signals 134. FSK signals 134 are frequency modulated signals that represent digital data using variations in the frequency of a carrier wave. Communication packets sent from power receiver 120 to power transmitter 110 may comprise amplitude shift key (ASK) signals 136. ASK signals 136 are amplitude modulated signals that represent digital data using variations in the amplitude of a carrier wave. While power transmitter 110 is described as sending FSK signals 134 and power receiver 120 is described as sending ASK signals 136, in other embodiments, power receiver 120 may alternatively send FSK signals and power transmitter 110 may alternatively send ASK signals. Any other manner of transmitting communication packets, data or other information between power transmitter 110 and power receiver 120 may alternatively be used.

Foreign object detection (FOD) circuitry is utilized to detect when foreign objects such as e.g., coins, paper clips, keys, aluminum foil, metallic objects, magnetic objects or any other objects, that may affect or be affected by the magnetic field generated by the power transmitter are positioned within the region where the magnetic field will be generated either before, during or after power transfer.

FOD circuity is configured to monitor the transmission coil of the power transmitter for changes in the quality (Q) factor, inductance, resistance or other properties of the transmission coil. For example, FOD circuity that is configured to monitor the Q factor of the transmission coil is sometimes referred to as QFOD circuitry. QFOD circuitry often performs measurements at a relatively low voltage, e.g., 50 milli-volts (mV). However, during power transfer, the voltage on the transmission coil may exceed 400 volts (V).

Power drivers sometimes comprise a semiconductor device and power delivery circuitry that is external to the semiconductor device. FOD circuitry may be integrated into the semiconductor device while components external to the semiconductor device may be utilized to perform a portion of the FOD or to prepare signals from the coil for the semiconductor device.

Figure 2:
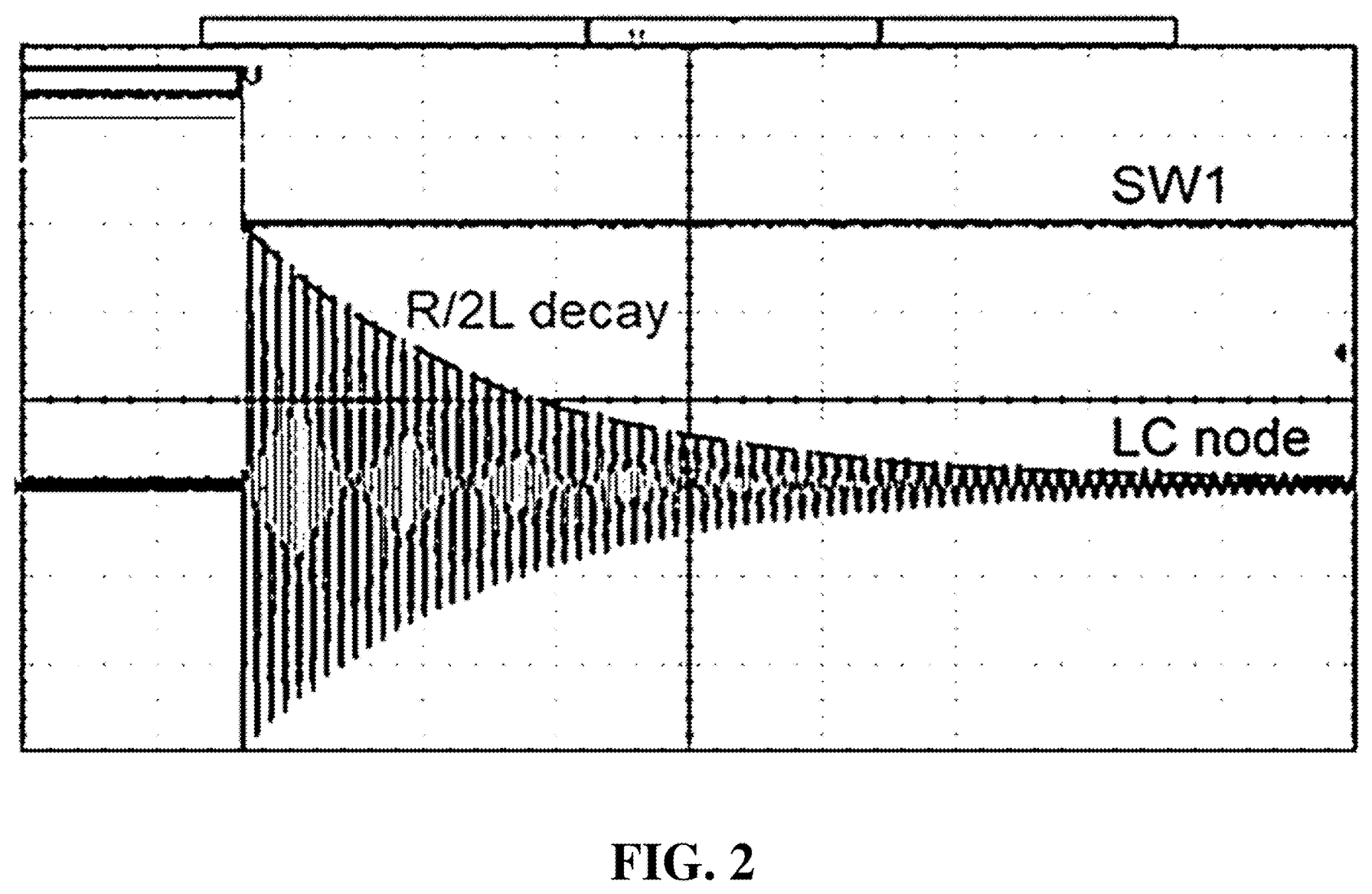

Referring now to FIG. 2, a diagram illustrating an example ideal measurement of the frequency and decay rate of a dampened sinusoidal interrogation signal on SW1, e.g., a Q-Ping interrogation signal, is shown. As seen in FIG. 2, the ideal measurement signal exhibits a R/2L decay on the inductor/capacitor (LC) node providing a well-balanced cone-like measurement waveform over time. The example diagram in FIG. 2 shows the measurement of an ideal linear system.

Figure 3:
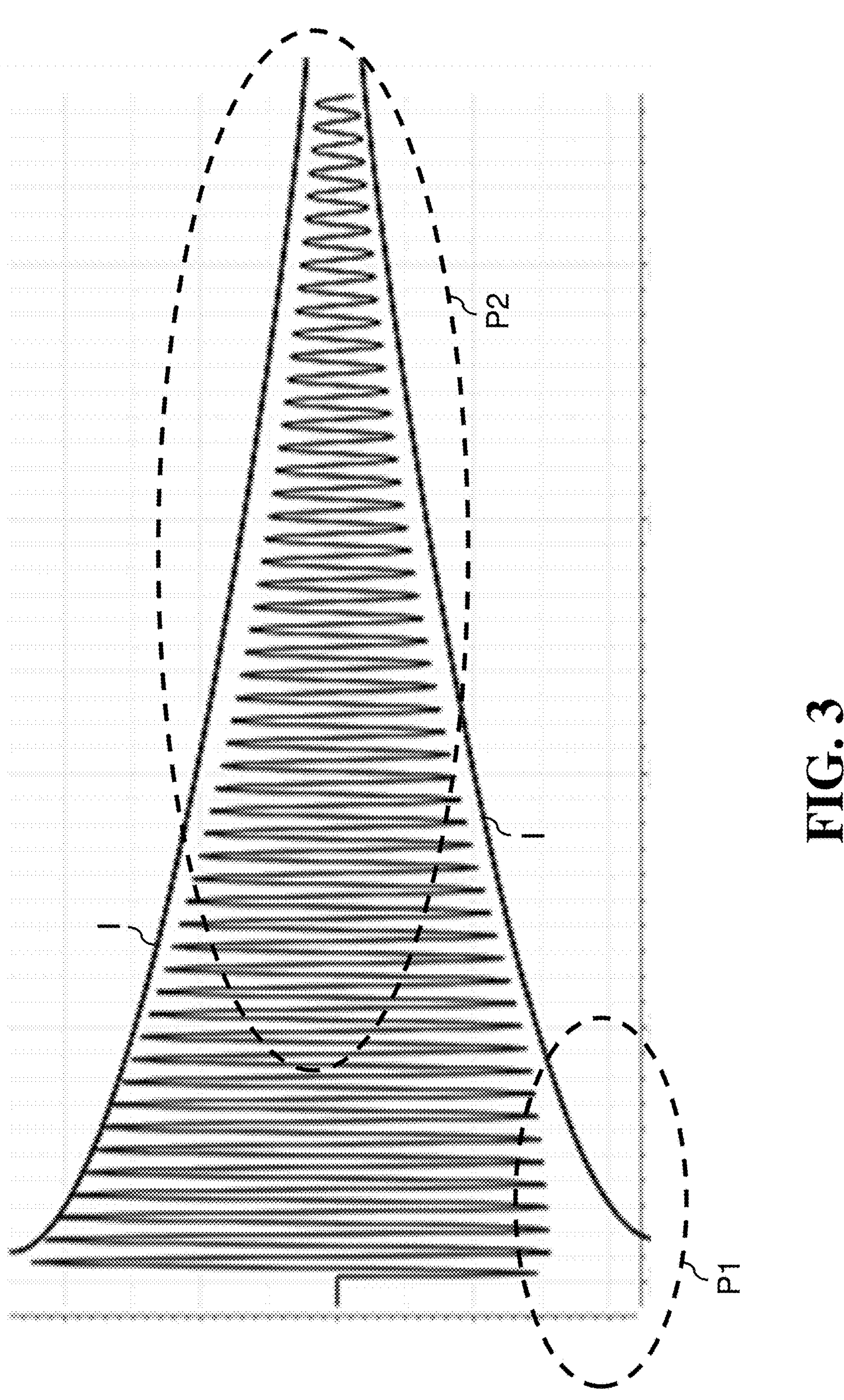
FIG. 3 is a diagram illustrating an example decay waveform during PRx and foreign object detection that results from distortions due to parasitic component turn and other noise on in the power transmitter of the system of FIG. 1 according to an embodiment.

However, there are often non-linearities in an actual system that may impact the measurement, e.g., due to diodes and other parasitic devices in the system. Referring now to FIG. 3, a diagram illustrating an example measurement signal in a case where there are non-linearities present such as parasitic diode and transistor turn-on distortions that occur during the measurement and cause truncation of the dampened waveform in a variety of manners. For example, as shown in FIG. 3, portion P1 and portion P2 of the measured waveform are distorted. As an example, portion P1 exhibits a truncation on the lower end of the waveform, shortening the value on the negative side relative to the ideal waveform shape I (curved lines). While portion P2 exhibits a truncation on both the positive and negative sides of the waveform relative to the ideal waveform shape I.

Figure 4:
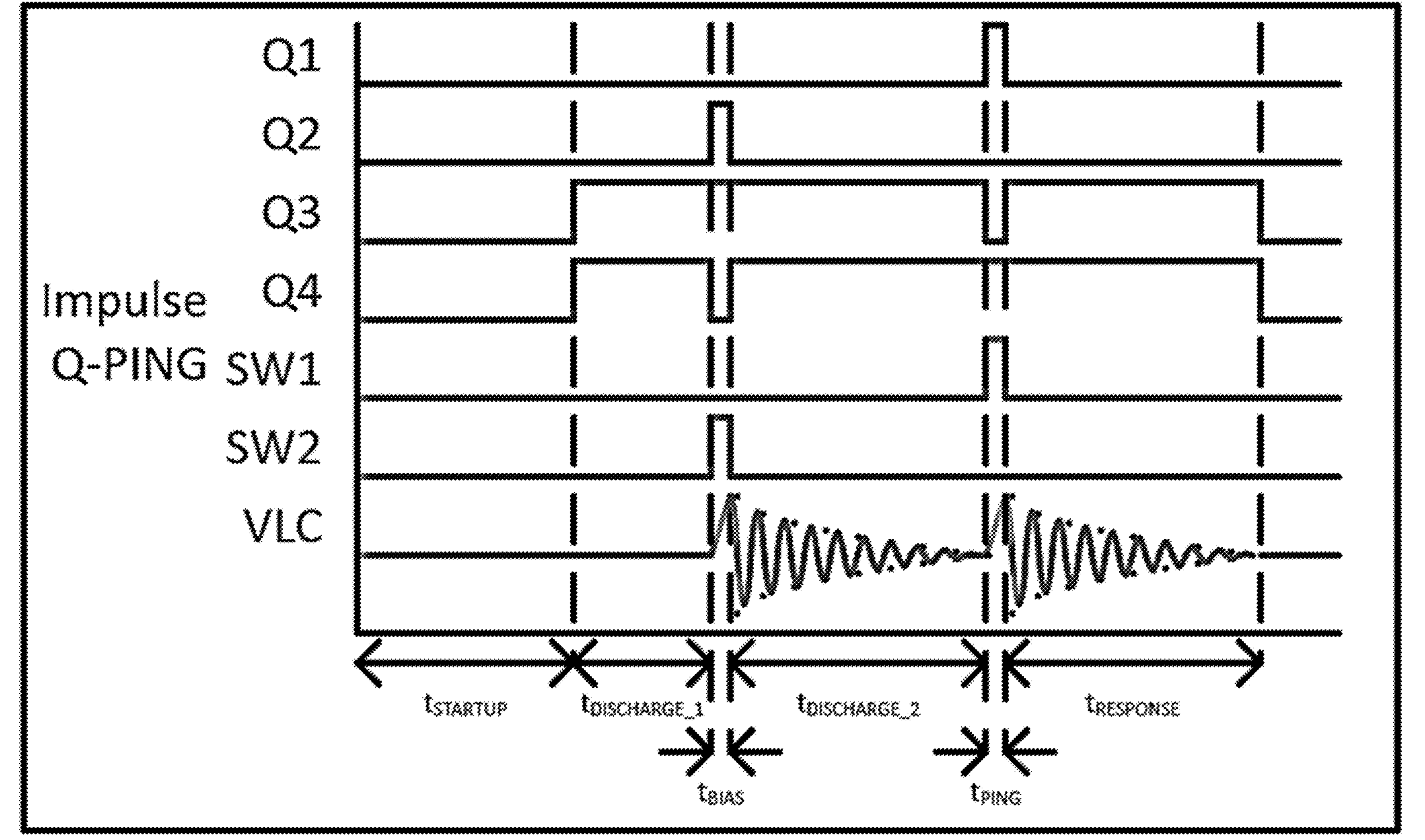
FIG. 4 is a signal diagram illustrating an example pulse method of performing PRx and foreign object detection according to an embodiment.

With reference to FIG. 4, an example signal diagram is shown that illustrates a pulse method that may be utilized in an effort to mitigate the effect of non-linear events such as a parasitic diode turn-on. In an ideal case, a pulse is provided on an SW2 line, e.g., by operating power transistors Q1-Q4, that charges the LC node at an initial time, e.g., measured as a voltage differential VLC across the capacitor C of the LC node. The LC node is then allowed to decay down for a predetermined period of time. A second energy pulse is then provided on an SW1 line, e.g., by operating transistors Q1-Q4, that again charges up the LC node. The LC node is then allowed to decay down as part of the measurement on VLC. This pulse method is intended to pre-bias any non-linear components such as diodes, however, there is often no guarantee that the LC node has fully discharged before the second pulse which may impact any later measurements. In addition, by utilizing the full voltage power supply and power driver transistors Q1-Q4 to perform the pulses, there is also a chance that power diodes in the power transmitter (PTx), power receiver (PRx) or other locations will turn on further inserting noise or other non-linearities into the system.

Figure 5:
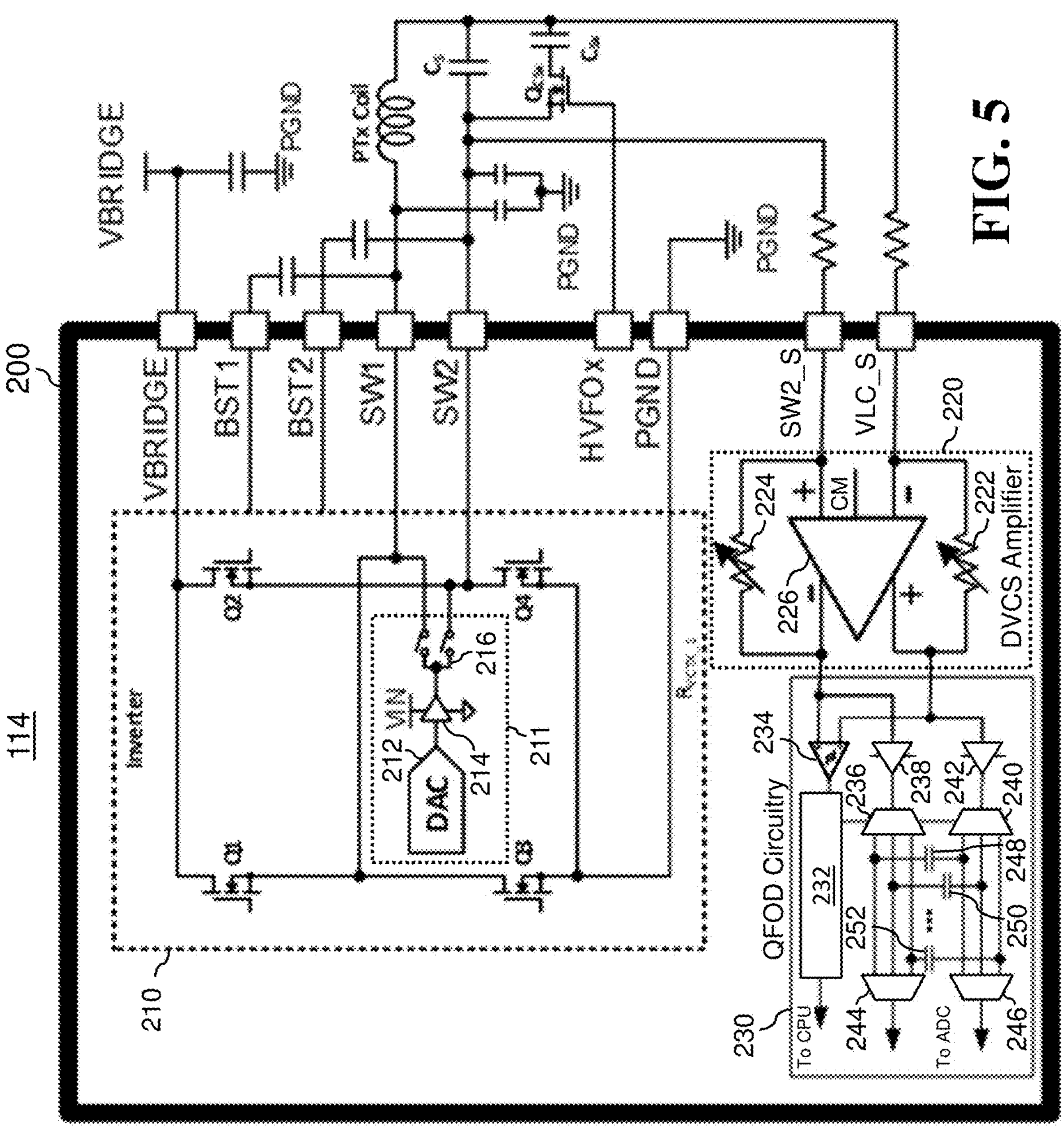
FIG. 5 is a circuit diagram illustrating an example power transmitter of the system of FIG. 1 according to an embodiment.

Referring now to FIG. 5, an illustrative embodiment of power driver 114 that comprises FOD functionality will now be described. Power driver 114 is configured to perform measurement of the frequency and decay rate of a dampened sinusoidal interrogation signal, e.g., during a Q-Ping process, in a manner that inhibits the distortion effects of the non-linearities described above including, e.g., parasitic diode and transistor turn-on events and power diode turn on events, during the interrogation and measurement process. Power driver 114 implements both charge-up and charge-down features, e.g., utilizing a low voltage buffer, e.g., 10 mV or other values in some embodiments, instead of the high energy power transistors and power supply, e.g., 10 V in some cases, which enhance control of parasitic diodes by first charging up the LC node to a precise charge level and then discharging the LC node down to a predetermined measurement level which is precisely controlled to ensure that parasitic diodes are disabled or, in some embodiments, not enabled in the first place during the charge up and charge down. In some embodiments, only one line need be utilized, e.g., SW2, while the other line may be left off.

Power driver 114 comprises a semiconductor device 200 and power driver circuitry including, e.g., an LC node comprising transmission coil PTx Coil and coil capacitor $C_S$, a diode $Q_{CSX}$, e.g., a field effect transistor (FET) such as a metal-oxide semiconductor FET (MOSFET) or another type of transistor implemented as a diode, and a capacitor $C_{SX}$ in combination, and other circuitry commonly found in power driver circuitry that is configured to drive transmission coil PTx Coil to generate magnetic fields for transferring power or information to power receiver 120. Transmission coil PTx Coil may be activated by semiconductor device 200 to transmit power to a power receiver 120, e.g., by activation transistors Q1, Q2, Q3, and Q4 in various combinations to drive outputs SW1 and SW2. While described herein as having a single transmission coil PTx Coil, additional transmission coils may also be implemented including corresponding coil capacitors or other circuitry components. As an example, in some embodiments a single transmission coil, two transmission coils, three transmission coils, four transmission coils or any other number of transmission coils may be included.

Sense inputs VLC_S and SW2_S of semiconductor device 200 are connected to either side of coil capacitor $C_S$ to provide a differential measurement of the charge on coil capacitor $C_S$. Each of sense inputs VLC_S and SW2_S is connected to coil capacitor $C_S$ via a corresponding resistor $R_1$, $R_2$ to ensure that the voltage of the signal received by semiconductor device 200 from coil capacitor $C_S$ is within the measurement range of semiconductor device 200. An example measurement range may be between 50 mV and 100 mV although other measurement ranges may alternatively be utilized. In some embodiments, MOSFETs may alternatively be utilized instead of resistors $R_1$ and $R_2$ so long as they have sufficient RDSON and can provide similar resistance values to resistors $R_1$ and $R_2$.

Semiconductor device 200 comprises, for example, a printed circuit board (PCB), integrated circuit (IC) or other circuitry, that is configured to control activation of transmission coil PTx Coil and also to perform monitoring and measurement of the characteristics of transmission coil PTx Coil and coil capacitor $C_S$ including, for example, interrogation signals such as Q-Ping, FOD and in some embodiments QFOD. In some embodiments, semiconductor device 200 is configured to perform measurements on coil capacitor $C_S$ before, during or after power transfer to determine whether a foreign object is located within the magnetic field region of the corresponding transmission coil PTx Coil of the LC node. In some embodiments, semiconductor device 200 may include controller 112.

Semiconductor device 200 comprises an inverter circuit 210, an amplifier circuit 220 and a FOD circuit 230.

Inverter circuit 210 comprises transistors Q1, Q2, Q3 and Q4, and a buffer circuit 211 comprising a digital to analog converter (DAC) 212, e.g., a high impedance voltage DAC, buffer amplifier 214, e.g., a low impedance buffer amplifier for DAC 212, and switching circuitry 216.

Inverter circuit 210 is configured to receive power from power supply VBRIDGE for powering the LC Node, transmission coil PTx Coil and coil capacitor $C_S$, via transistors Q1, Q2, Q3 and Q4.

The DAC 212, buffer amplifier 214 and switching circuitry 216 are configured as a buffer circuit 211 for both the charge up and charge down so the system can precisely set the measurement charge on the LC Node and, if necessary, pre-charge any un-used capacitors to inhibit distortion of the interrogation signal waveform due to accidental turn on. Buffer circuit 211 may be utilized to both charge up and then charge down the LC node and if necessary to pre-charge any capacitors in a precise manner at a slow rate that does not risk turning on the power diodes. In addition, buffer circuit 211 is independent of the inverter and VBRIDGE characteristics that would normally cause an activation of the power diodes.

Switching circuitry 216 is configured to select between outputs SW1 and SW2 for use by buffer circuit 211. Switching circuitry 216 may also select no outputs, e.g., by opening both switches.

Amplifier circuit 220 is configured to amplify and adjust the sensed signals SW2_S and VLC_S received from the power driver circuitry and comprises feedback resistors 222 and 224 and an amplifier 226. Amplifier circuit 220 may, for example, comprise a DVCS amplifier. Positive and negative outputs of amplifier 226 are provided as inputs to FOD circuit 230.

Amplifier circuit 220 is configured to monitor the voltage across the capacitor $C_S$, e.g., as inputs SW2_S and VLC_S. Monitoring the differential voltage allows amplifier circuit 220 to inhibit or reduce the impact of the GPIO diodes from causing corruption of the measurement and to allow larger signal magnitudes to be used for the measurement. Amplifier circuit 220 also is configured to compensate for high voltage impedance issues which complicate a GPIO implementation.

A resistance of each of feedback resistors 222 and 224 is adjustable between a minimum resistance value and a maximum resistance value to adjust a gain of amplifier 226. For example, in some embodiments, feedback resistors 222 and 224 may have a resistance that is adjustable in a range of, e.g., 100 kOhm to 1 kOhm. In other embodiments, other resistance values may alternatively be used for the range. Feedback resistors 222 and 224 may also have a high resistance "off" setting such as, e.g., 10 MOhms, in some embodiments. In an illustrative embodiment, controller 112 is configured to adjust the resistance value of feedback resistors 222 and 224. For example, before buffer circuit 211 is activated to charge the LC node for measurement, controller 112 may be configured to adjust the resistance value of feedback resistors 222 and 224 to target resistance values that ensure that the voltage received from coil capacitor $C_S$ is mitigated to a level that will not damage semiconductor device 200, amplifier circuit 220 and FOD circuit 230. After the buffer circuit 211 is activated to adjust the charge on the LC node, the resistance values of feedback resistors 222 and 224 may be progressively adjusted, e.g., increased or decreased, by controller 112 until the voltages from each of the positive and negative outputs of amplifier 226 are within a target range for measurement by FOD circuit 230. As an example, in some embodiments, amplifier circuit 220 and FOD circuit 230 may be configured to measure voltages in a particular range, e.g., 0 mV to 50 mV or another range. In one example, the resistances of feedback resistors 222 and 224 may be set by controller 112 to small values, e.g., minimum resistance values such as 1 kOhm, and may be gradually increased until the output voltages are within the target range.

In some embodiments, for example, the target resistance values may be the minimum resistance value of each of feedback resistors 222 and 224. In other embodiments, the target resistance values may be resistance values that correspond to a voltage input range of the measurement system such as FOD circuitry 230 or the ADC output of FOD circuitry 230. In other embodiments, the target resistance values may be resistance values that correspond to a maximum voltage sustainable by amplifier circuit 220, FOD circuit 230 and semiconductor device 200 without damage. In other embodiments, the target resistance values may be resistance values that are between the resistance values that corresponds to the maximum voltage sustainable by amplifier circuit 220, FOD circuit 230 and semiconductor device 200 without damage and the minimum resistance values of feedback resistors 222 and 224. In other embodiments, the target resistance values may also or alternatively correspond to a maximum voltage that may occur before amplifier circuit 220 and FOD circuit 230 would be saturated. In other embodiments, the target resistance values may also or alternatively be large enough to ensure that a signal-to-noise ratio is available to be measured. Any of the above criteria or any other criteria may be used together or individually to determine the target resistance values for feedback resistors 222 and 224.

FOD circuit 230 comprises control circuitry 232 that outputs to controller 112 and is fed by an operational amplifier 234 which receives the positive side signal and negative side signal outputs of amplifier 226 as inputs.

FOD circuit 230 also comprises a sample and hold circuit comprising a TMUX 236 that is fed by an operational amplifier 238 which receives the negative side signal output of amplifier 226 as an input and TMUX 240 that is fed by an operational amplifier 242 which receives the positive side signal output of amplifier 226 as an input. Operational amplifiers 238 and 242 are configured to operate as peak/valley amplifiers that capture the Peak or Valley voltage of the waveform generated by amplifier circuit 220. In some embodiments, TMUX 236, 240, 244, and 246 of FOD circuit 230 may also or alternatively be utilized to capture the Peak and Valley voltages. In either case, FOC circuit 230 is configured to capture and/or store the maximum and minimum voltage for a particular oscillation. In some embodiments, the maximum and minimum voltages may also or alternatively be stored digitally via the ADC output of FOD circuitry 230.

TMUX 236 and TMUX 240 are controlled by control circuitry 232. TMUX 236 is configured to select between a plurality of sample and hold signals paths, e.g., three, or any other number, that are fed into a corresponding TMUX 244 which is configured to select between the signal paths for output to an analog-to-digital converter (ADC) circuit. Similarly, TMUX 240 is configured to select between a plurality of sample and hold signal paths, e.g., three, or any other number, that are fed into a corresponding TMUX 246 which is configured to select between the signal paths for output to the ADC circuit.

Each signal path between TMUX 236 and TMUX 244 is connected to a corresponding signal path between TMUX 240 and TMUX 246 by a corresponding capacitor, e.g., capacitors 248, 250, 252, which are configured to hold a charge value corresponding to the differential voltage between the signal input into TMUX 236 and the signal input into TMUX 244 while that signal path is selected. For example, in some embodiments, TMUX 236 and TMUX 244 may be configured to select the signal paths that correspond to the same capacitor in order to sample and hold the differential voltage as a charge on the corresponding capacitor, e.g., the signal paths corresponding to capacitor 248 as an example.

The ADC circuit measures the outputs of TMUX 244 and TMUX 246 and converts them to digital data which is utilized by controller 112 to mathematically calculate a FOD measurement, e.g., based on the differential between measured ADC values and zero crossing data to determine the Q of the waveform. Similar to TMUX 236 and TMUX 240, in some embodiments, the signal paths corresponding to the same capacitor, e.g., capacitor 248, may be selected by TMUX 244 and TMUX 246 to output to the ADC at the same time, enabling the differential voltage across the capacitor to be measured for the held sample.

While FOD circuit 230 is illustrated in FIG. 5 as including sample and hold functionality via TMUX 236, TMUX 240, TMUX 244 and TMUX 246, in other embodiments, the sample and hold functionality implemented by TMUX 236, TMUX 240, TMUX 244 and TMUX 246 may not be included in FOD circuit 230 where, for example, operational amplifiers 238 and 242 may instead output directly to the ADC. In some embodiments, amplifier circuit 220 may also or alternatively output directly to the ADC whether or not all or a portion of FOD circuitry 230 is present.

Amplifier circuit 220 monitors the voltage across capacitor $C_S$ to inhibit or eliminate a potential GPIO diode-based corruption in the measurement which allows larger signal magnitudes to be used for measurement. Amplifier circuit 220 also compensates for high voltage impedance issues which may complicate a GPIO implementation. As described above, FOD circuit 230 implements a fully differential sample and hold circuit in the semiconductor device 200, providing an improvement over differential ADC circuits where the output of the amplifier is fed directly into an ADC and the differential is determined solely on the digital side.

While the sample and hold circuit is illustrated as a fully differential circuit corresponding to both sides of capacitor $C_S$, in other embodiments, each half of the sample and hold circuit of FOD circuit may have its own corresponding capacitors connected to a ground. For example, the circuit paths between TMUX 236 and TMUX 244 may be electrically separate from the circuit paths between TMUX 240 and TMUX 246 and instead may each be connected to ground via a corresponding capacitor. The outputs of each of the signal paths to TMUX 244 and TMUX 246 may then provide the differential between ground and the charges on their respective capacitor to the ADC instead of the differential between the signal paths as set based on the output of amplifier circuit 220.

Figure 6:
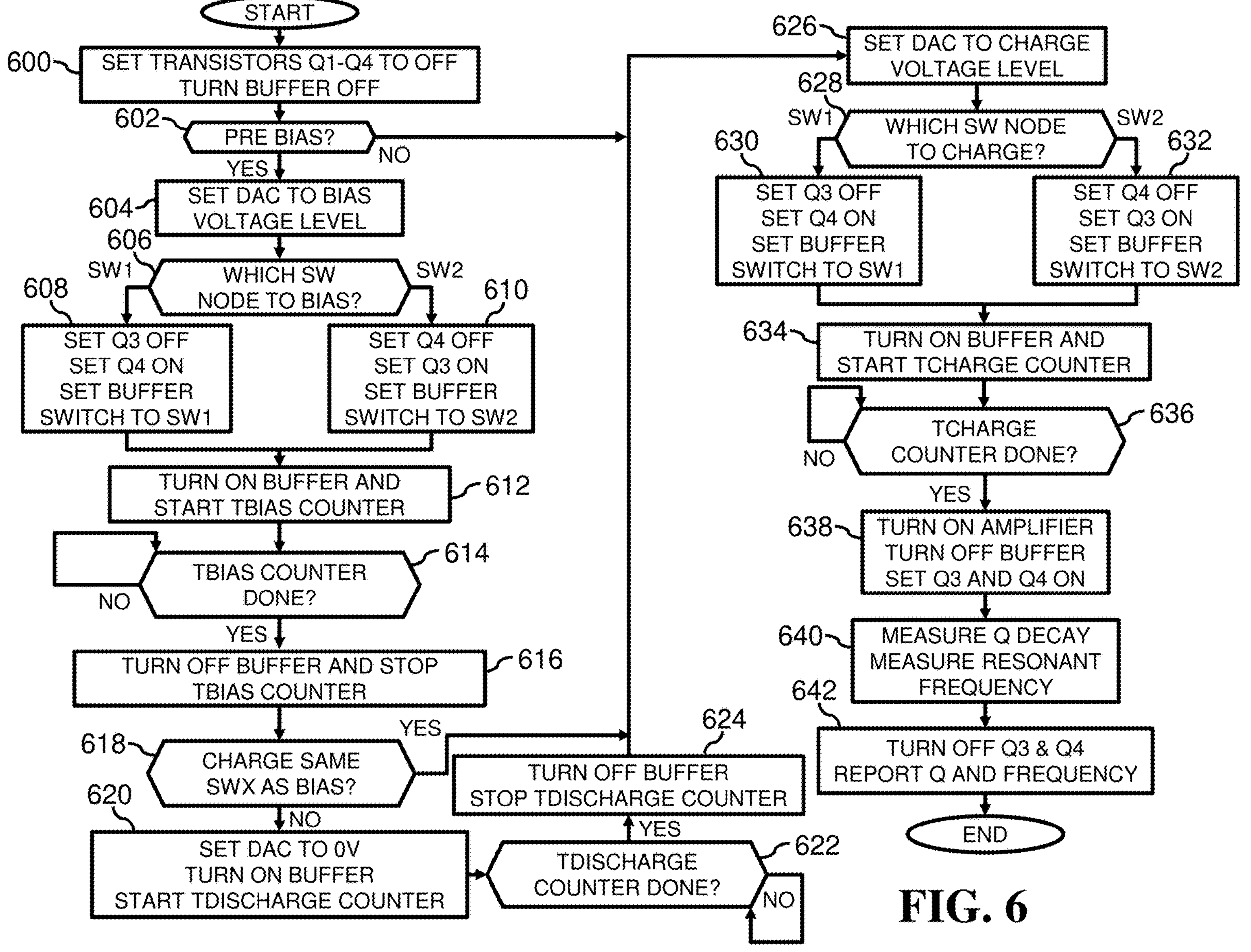
FIG. 6 is a flow diagram of an example process performed by a controller of the power transmitter of FIG. 1 using the power transmitter of FIG. 5 according to an embodiment.

With reference now to FIG. 6 an example process of performing FOD detection will now be described. The process of FIG. 6 comprises steps 600 through 642 and is illustrated in part by FIGS. 7 and 8 with reference also to the circuitry of FIG. 5.

At step 600, controller 112 sets transistors Q1-Q4, DAC 212 and buffer circuit 211 to OFF and opens switching circuitry 216.

At step 602, controller 112 determines whether or not to perform a pre-bias routine. If controller determines to perform the pre-bias routine the process proceeds to step 604. If the controller determines not to perform the pre-bias routine, the process proceeds to step 626. Controller 112 may make this determination, for example, based on user settings or other parameters for the particular system in which power driver 114 is being implemented. For example, the determination may be pre-configured for the target use case, during assembly, at an intermediary fabricator, at the end user or in any other manner. Note that FIGS. 7 and 8 both illustrate scenarios where controller 112 determines to perform the pre-bias routine. In other scenarios, only a charge routine may be needed, e.g., if controller 112 determines not to perform the pre-bias routine. Such a scenario would be similar to the SW1 node of FIG. 8 if the SW2 node was not biased and discharged first.

At step 604, controller 112 sets the DAC voltage to the bias voltage level, e.g., 10 mV or another value in some embodiments.

Figure 7:
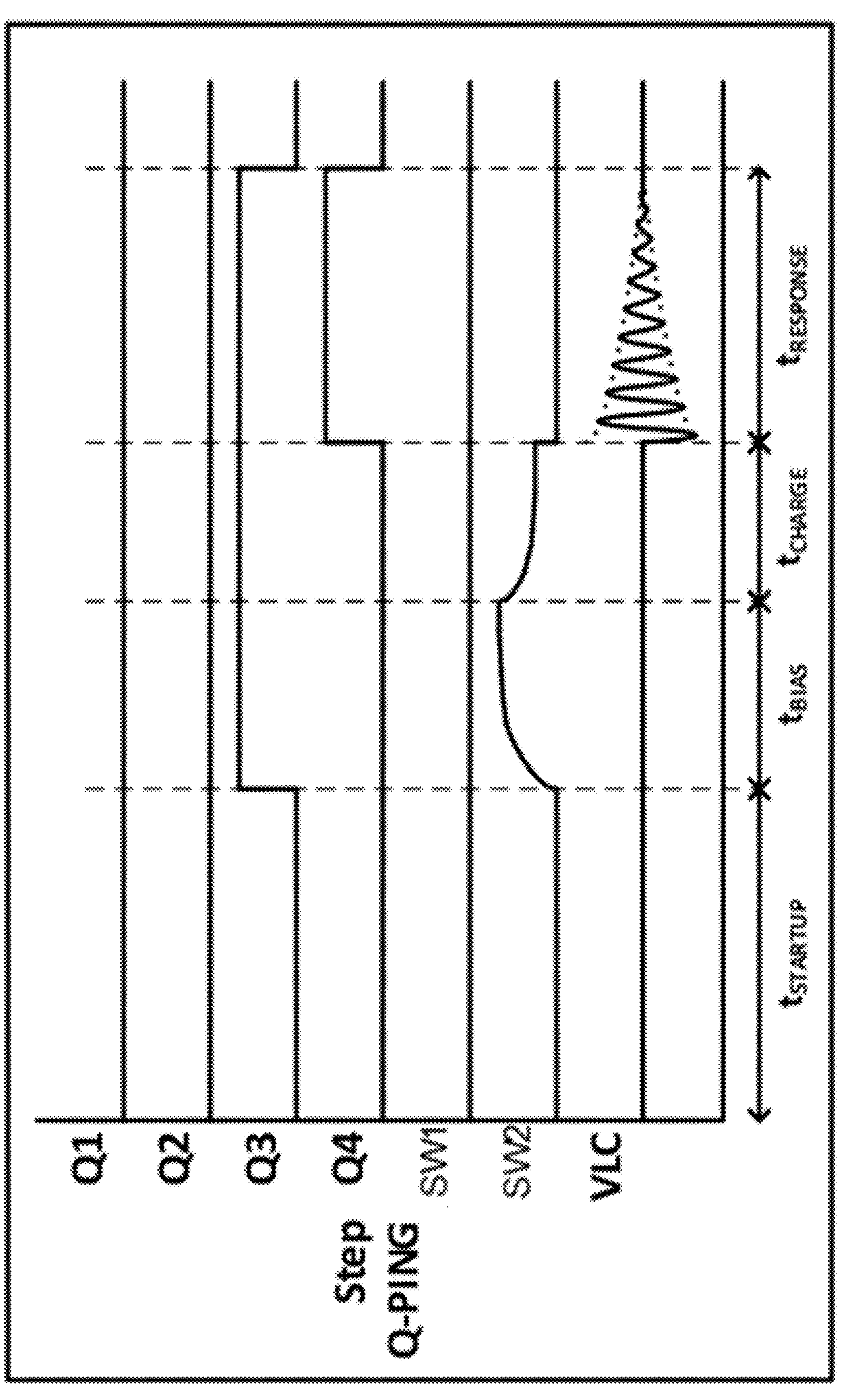
FIG. 7 is a signal diagram illustrating a portion of the example process of FIG. 6 according to an embodiment.
Figure 8:
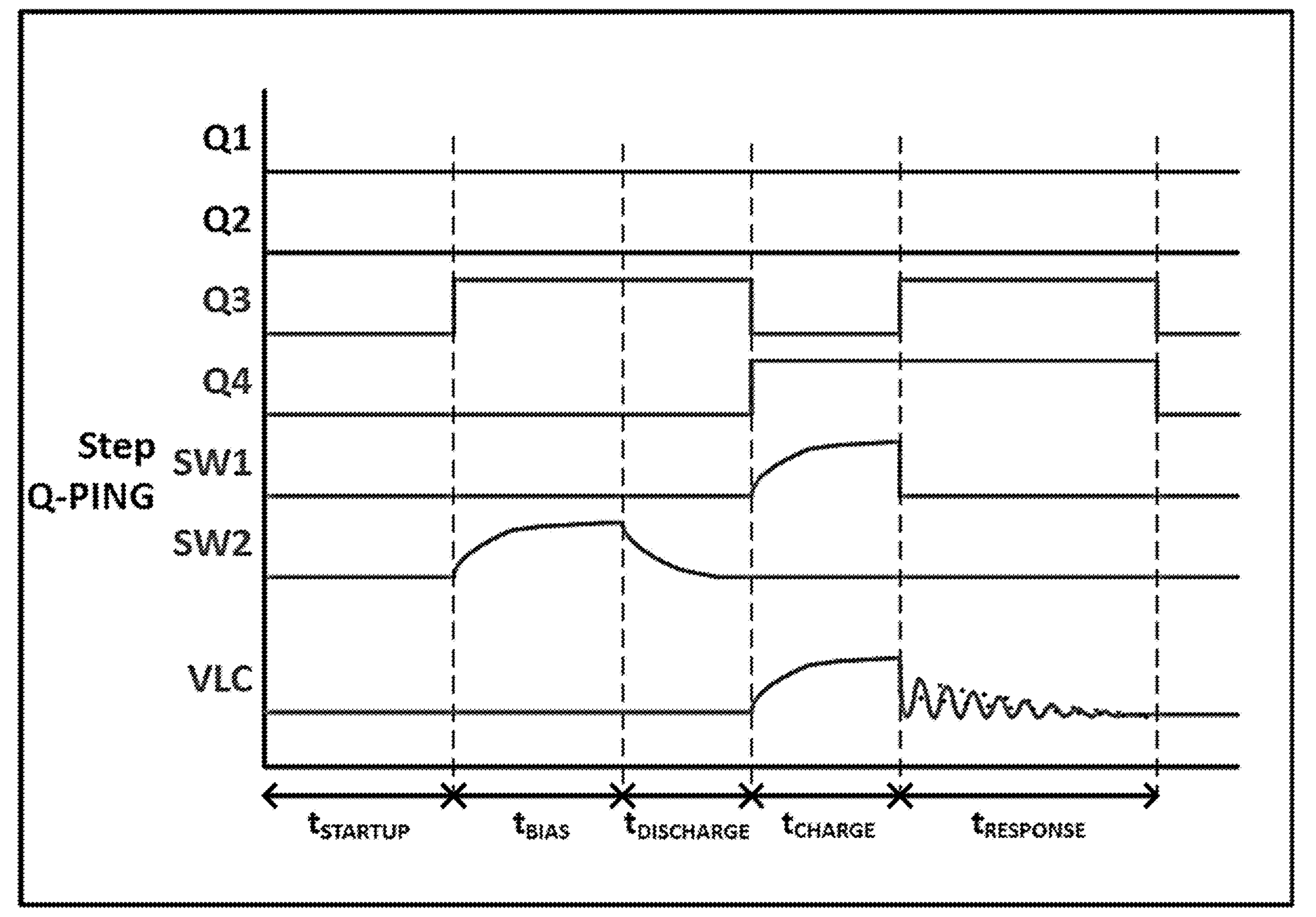
FIG. 8 is a signal diagram illustrating another portion of the example process of FIG. 6 according to an embodiment.

At step 606, controller 112 determines which SW node to execute the pre-bias routine on. If controller 112 determines that the pre-bias routine is to be performed on the SW1 Node, the process proceeds to step 608. If controller 112 determines that the pre-bias routine is to be performed on the SW2 node, the process proceeds to step 610. For example, in some embodiments, a bias and charge routine may be performed on the same SW node, e.g., SW2 as shown in FIG. 7. In other embodiments, a bias and discharge routine may be performed on one SW node, e.g., SW2, followed by a separate charge routine on the other SW node, e.g., SW1, as shown in FIG. 8. Other combinations or sub-combinations of the bias, discharge and charge routines may be performed on the SW1 and SW2 nodes in any other order or combination. Controller 112 may make this determination, for example, based on user settings or other parameters for the particular system in which power driver 114 is being implemented. For example, the determination may be pre-configured for the target use case, during assembly, at an intermediary fabricator, at the end user or in any other manner.

If the SW1 node is selected, controller 112 sets transistor Q3 to OFF, transistor Q4 to ON, configures buffer amplifier 214 and activates switching circuitry 216 to select the path to the SW1 node at step 608. The process then proceeds to step 612.

If the SW2 node is selected, controller 112 sets transistor Q4 to OFF, transistor Q3 to ON, configures the buffer amplifier 214 and activates switching circuitry 216 to select the path to the SW2 node at step 610. The process then proceeds to step 612.

At step 612, controller 112 turns on the buffer amplifier 214 and starts a counter $T_{BIAS}$.

At step 614, controller 112 determines whether the $T_{BIAS}$ counter has exceeded a predetermined threshold number of counts. If the $T_{BIAS}$ counter has not exceeded the predetermined threshold number of counts, the process continues at step 614. In some embodiments, the $T_{BIAS}$ counter may alternatively start at a predetermined value and count down to 0 or another threshold value. If the $T_{BIAS}$ counter has exceeded the predetermined threshold number of counts (or counted down to 0 or the other threshold value), the process proceeds to step 616. The $T_{BIAS}$ counter is configured to ensure that the LC node is sufficiently charged up to the target voltage output by DAC 212, e.g., as shown on the SW2 node in FIGS. 7 and 8, and may be mathematically set based on the properties of the system. In other embodiments, the charge on the selected SW node may also or alternatively be monitored to ensure a target charge value is reached, e.g., by an ADC, amplifier circuit 220, FOD circuit 230 or in any other manner.

At step 616, controller 112 turns off buffer amplifier 214 and stops the $T_{BIAS}$ counter. In some embodiments, the $T_{BIAS}$ counter may also be reset to 0 or another predetermined value.

At step 618, controller 112 determines whether to charge the same SW node as the one that was biased by steps 612-616 or to charge another SW node. If controller 112 determines that the same SW node will be used, the process proceeds to step 620. If controller 112 determines that the other SW node will be used, the process proceeds to step 626. Controller 112 may make this determination, for example, based on user settings or other parameters for the particular system in which power driver 114 is being implemented. For example, the determination may be pre-configured for the target use case, during assembly, at an intermediary fabricator, at the end user or in any other manner.

If the same SW node is selected, controller 112 sets the DAC 212 to 0V, turns on buffer amplifier 214, and starts a counter $T_{DISCHARGE}$ at step 620. This discharge routine may be needed, for example, to ensure that the SW2 node is fully discharged before charging is later performed on the SW1 node. The process then proceeds to step 622.

At step 622, controller 112 determines whether the $T_{DISCHARGE}$ counter has exceeded a predetermined threshold number of counts. If the $T_{DISCHARGE}$ counter has not exceeded the predetermined threshold number of counts, the process continues at step 622. In some embodiments, the $T_{DISCHARGE}$ counter may alternatively start at a predetermined value and count down to 0 or another threshold value. If the $T_{DISCHARGE}$ counter has exceeded the predetermined threshold number of counts (or counted down to 0 or the other threshold value), the process proceeds to step 624. The $T_{DISCHARGE}$ counter is configured to ensure that the selected LC node is fully discharged to 0V or another value as set by DAC 212, e.g., as shown on the SW 2 node in FIG. 8, and may be mathematically set based on the properties of the system. In other embodiments, the charge on the selected SW node may also or alternatively be monitored to ensure a target discharge value is reached, e.g., by an ADC, amplifier circuit 220, FOD circuit 230 or in any other manner.

At step 624, controller 112 turns off buffer amplifier 214 and stops the $T_{DISCHARGE}$ counter. In some embodiments, the $T_{DISCHARGE}$ counter may also be reset to 0 or another predetermined value. The process then proceeds to step 626.

At step 626, controller 112 sets DAC 212 to a charge voltage level, e.g., 10 mV or another value. In some embodiments, the charge voltage level may be equal to a pre-bias voltage level. In other embodiments, the charge voltage level may be smaller than a pre-bias voltage level. Note that the process may reach step 626 from any of steps 602 (no pre-bias routine), 618 (different SW node for charging after a pre-bias routine) and 624 (after a discharge following a pre-bias routine). The process then proceeds to step 628.

At step 628, controller 112 determines which SW node to execute the charge routine on. If controller 112 determines that the charge routine is to be performed on the SW1 Node, the process proceeds to step 630. If controller 112 determines that the charge routine is to be performed on the SW2 node, the process proceeds to step 632. Controller 112 may make this determination, for example, based on user settings or other parameters for the particular system in which power driver 114 is being implemented. For example, the determination may be pre-configured for the target use case, during assembly, at an intermediary fabricator, at the end user or in any other manner. For example, the charge routine may be performed on the same SW node as a pre-bias routine, e.g., as shown in FIG. 7, may be performed on a SW node different than a pre-bias and discharge routine, e.g., as shown in FIG. 8, or in any other manner.

If the SW1 node is selected, controller 112 sets transistor Q3 to OFF, transistor Q4 to ON, configures buffer amplifier 214 and activates switching circuitry 216 to select the path to the SW1 node at step 630. The process then proceeds to step 634.

If the SW2 node is selected, controller 112 sets transistor Q4 to OFF, transistor Q3 to ON, sets the buffer amplifier 214 and activates switching circuitry 216 to select the path to the SW2 node at step 632. The process then proceeds to step 634.

At step 634, controller 112 turns on the buffer amplifier 214 and starts a counter $T_{CHARGE}$.

At step 636, controller 112 determines whether the $T_{CHARGE}$ counter has exceeded a predetermined threshold number of counts. If the $T_{CHARGE}$ counter has not exceeded the predetermined threshold number of counts, the process continues at step 636. In some embodiments, the $T_{CHARGE}$ counter may alternatively start at a predetermined value and count down to 0 or another threshold value. If the $T_{CHARGE}$ counter has exceeded the predetermined threshold number of counts (or counted down to 0 or the other threshold value), the process proceeds to step 638. The $T_{CHARGE}$ counter is configured to ensure that the selected LC node is charged to the target voltage value for measurement purposes as set by DAC 212, e.g., as shown on the SW2 node in FIG. 7 and the SW1 node in FIG. 8, and may be mathematically set based on the properties of the system. In other embodiments, the charge on the selected SW node may also or alternatively be monitored to ensure a target charge value is reached, e.g., by an ADC, amplifier circuit 220, FOD circuit 230 or in any other manner.

At step 638, controller 112 turns on amplifier circuit 220 and FOD circuit 230, turns off buffer amplifier 214 and sets Q3 and Q4 to ON.

At step 640, controller 112 measures the Q decay and resonant frequency based on the outputs of FOD circuit 230, e.g., as shown by the $T_{RESPONSE}$ measurement region on FIGS. 7 and 8.

At step 642, controller 112 turns off Q3 and Q4, and reports the Q and resonant frequency measurements. The process then ends.

While the above example process is described as having particular steps or steps in a particular order, in other embodiments only some of the steps may be performed or the steps may be performed in any other order.

By removing the need for activating high voltage rating MOSFETs or other high noisy components for monitoring or measuring the characteristics of the transmission coil, the disclosed embodiments mitigate or reduce the amount of parasitic resistance and capacitance on the signals received from the transmission coil which significantly reduces the effect of filtering on the signals that are provided to amplifier circuit 220, FOD circuit 230 and controller 112 and increases the accuracy of the measurement by semiconductor device 200. The measurement using a low voltage charge routine and in some cases low voltage biasing and discharge routines as output by a buffer, enables accurate measurement while inhibiting the effect of parasitic diodes or other component turn-ons or, in some cases, even preventing such parasitic components from turning on entirely. In addition, the measurement process itself is optimized by providing differential measurement in an analog manner via amplifier circuit 220 and FOD circuit 230.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device comprising:

a buffer circuit that is configured to selectively output a charge signal to an inductor-capacitor node of a power driver to charge the inductor-capacitor node to a predetermined voltage level, wherein the buffer circuit comprises a plurality of switches, each switch corresponding to a given path through the inductor-capacitor node of the power driver;

an amplifier circuit that is configured to monitor a voltage differential across a capacitor of the inductor-capacitor node of the power driver, the amplifier circuit being configured to output a positive side signal and a negative side signal; and an output that is configured to provide at least one signal based on the positive side signal and negative side signal to an analog-to-digital converter for measurement by a controller.

2. The semiconductor device of claim 1, wherein the buffer circuit comprises a digital-to-analog converter that is configured to generate the charge signal at a voltage that is smaller than a voltage used by power transistors to energize the inductor-capacitor node.

3. The semiconductor device of claim 2, wherein the digital-to-analog converter is configured to generate the charge signal at a first voltage to bias the inductor-capacitor node and at a second voltage to charge the inductor-capacitor node to the predetermined voltage level.

4. The semiconductor device of claim 3, wherein the digital-to-analog converter is configured to generate the charge signal at a third voltage to discharge the inductor-capacitor node.

5. The semiconductor device of claim 1, wherein the semiconductor device further comprises:

a sample and hold circuit that is configured to:

sample the positive side signal and negative side signal; and store a voltage value based on a measurement of at least one of the positive side signal and negative side signal, the voltage value stored by the sample and hold circuit comprising a voltage differential between the positive side signal and the negative side signal, the sample and hold circuit being configured to output the stored voltage value to the analog-to-digital converter for measurement by the controller via the output.

6. The semiconductor device of claim 5, wherein the sample and hold circuit comprises:

a first pair of multiplexers comprising a first plurality of signal paths therebetween;

a second pair of multiplexers comprising a second plurality of signal paths therebetween; and a plurality of sample and hold capacitors, each sample and hold capacitor being electrically connected between one of the signal paths of the first plurality of signal paths and a corresponding one of the signal paths of the second plurality of signal paths and configured to store the voltage differential between the positive side signal and the negative side signal when the corresponding signal path is activated, the stored voltage differential corresponding to a peak or valley in the voltage differential between the positive side signal and the negative side signal.

7. A wireless power transmitter comprising a controller, the controller being configured to:

execute a bias routine comprising:

setting a buffer circuit of a semiconductor device of the wireless power transmitter to a bias voltage level;

turning on an output of the buffer circuit to an inductor-capacitor node of a power driver of the wireless power transmitter to charge the inductor-capacitor node to the bias voltage level;

determining that the inductor-capacitor node has achieved the bias voltage level; and turning off the output of the buffer circuit;

execute a charge routine comprising:

setting the buffer circuit to a charge voltage level that is smaller than the bias voltage level;

turning on the output of the buffer circuit to the inductor-capacitor node to charge the inductor-capacitor node to the charge voltage level;

determining that the inductor-capacitor node has achieved the charge voltage level; and turning off the output of the buffer circuit; and execute a measurement routine comprising:

activating an amplifier circuit of the semiconductor device that is configured to monitor a voltage differential across a capacitor of the inductor-capacitor node and output a positive side signal and a negative side signal; and measure at least one characteristic of the inductor-capacitor node based at least in part on the positive side signal and the negative side signal.

8. The wireless power transmitter of claim 7, wherein the at least one characteristic comprises at least one of a Q decay and a resonant frequency of the inductor-capacitor node.

9. The wireless power transmitter of claim 7, wherein measuring the at least one characteristic of the inductor-capacitor node based at least in part on the positive side signal and the negative side signal comprises sampling and holding a differential voltage between the positive side signal and the negative side signal in a sample and hold circuit.

10. The wireless power transmitter of claim 9, wherein sampling and holding the differential voltage between the positive side signal and the negative side signal in the sample and hold circuit comprises storing the differential voltage on one or more capacitors of the sample and hold circuit.

11. The wireless power transmitter of claim 7, wherein the controller is further configured to execute a discharge routine comprising:

setting the buffer circuit to a discharge voltage level;

turning on the output of the buffer circuit to the inductor-capacitor node to discharge the inductor-capacitor node to the discharge voltage level;

determining that the inductor-capacitor node has achieved the discharge voltage level; and turning off the output of the buffer circuit.

12. The wireless power transmitter of claim 11, wherein the controller is configured to execute the discharge routine after executing the bias routine.

13. The wireless power transmitter of claim 11, wherein the controller is configured to execute the discharge routine before executing the charge routine.

14. The wireless power transmitter of claim 11, wherein the controller is configured to:

select a first path through the inductor-capacitor node for the output of the bias voltage level by the buffer circuit;

select the first path for the output of the discharge voltage level by the buffer circuit; and select a second path through the inductor-capacitor node for the output of the charge voltage level by the buffer circuit.

15. The wireless power transmitter of claim 7, wherein the controller is configured to select between at least a first path through the inductor-capacitor node and a second path through the inductor-capacitor node for output by the buffer circuit, the execution of each of the bias routine and the charge routine by the controller comprising the controller setting the output of the buffer circuit to one of the first path and the second path.

16. The wireless power transmitter of claim 15, wherein the controller is configured to select the first path for both the bias routine and the charge routine.

17. The wireless power transmitter of claim 15, wherein the controller is configured to select the first path for the bias routine and the second path for the charge routine.

18. A method of operating a wireless power transmitter comprising:

executing a bias routine comprising:

setting a buffer circuit of a semiconductor device of the wireless power transmitter to a bias voltage level;

turning on an output of the buffer circuit to an inductor-capacitor node of a power driver of the wireless power transmitter to charge the inductor-capacitor node to the bias voltage level;

determining that the inductor-capacitor node has achieved the bias voltage level; and turning off the output of the buffer circuit;

executing a charge routine comprising:

setting the buffer circuit to a charge voltage level that is smaller than the bias voltage level;

turning on the output of the buffer circuit to the inductor-capacitor node to charge the inductor-capacitor node to the charge voltage level;

determining that the inductor-capacitor node has achieved the charge voltage level; and turning off the output of the buffer circuit; and executing a measurement routine comprising:

activating an amplifier circuit of the semiconductor device that is configured to monitor a voltage differential across a capacitor of the inductor-capacitor node and output a positive side signal and a negative side signal; and measure at least one characteristic of the inductor-capacitor node based at least in part on the positive side signal and the negative side signal.

19. The method of claim 18, further comprising executing a discharge routine after the bias routine and before the charge routine, the discharge routine comprising:

setting the buffer circuit to a discharge voltage level;

turning on the output of the buffer circuit to the inductor-capacitor node to discharge the inductor-capacitor node to the discharge voltage level;

determining that the inductor-capacitor node has achieved the discharge voltage level; and turning off the output of the buffer circuit.

* * * * *